United States Patent
Suryanarayana et al.

(10) Patent No.: US 10,732,889 B2
(45) Date of Patent: Aug. 4, 2020

(54) INFORMATION HANDLING SYSTEM WITH MULTI-KEY SECURE ERASE OF DISTRIBUTED NAMESPACE

(71) Applicant: DELL PRODUCTS, LP, Round Rock, TX (US)

(72) Inventors: Shekar Babu Suryanarayana, Bangalore (IN); Chitrak Gupta, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/918,503

(22) Filed: Mar. 12, 2018

(65) Prior Publication Data

US 2019/0278509 A1  Sep. 12, 2019

(51) Int. Cl.
G06F 3/06 (2006.01)
H04L 9/08 (2006.01)

(52) U.S. Cl.
CPC .......... G06F 3/0652 (2013.01); G06F 3/0604 (2013.01); G06F 3/0644 (2013.01); G06F 3/0679 (2013.01); H04L 9/0866 (2013.01); G06F 2221/2143 (2013.01)

(58) Field of Classification Search
None
See application file for complete search history.

(56) References Cited

U.S. PATENT DOCUMENTS

| | | | |
|---|---|---|---|
| 7,623,378 B1 | 11/2009 | Wahlstrom et al. | |
| 2013/0097369 A1* | 4/2013 | Talagala | G06F 12/0246 711/103 |
| 2015/0089209 A1* | 3/2015 | Jacobs | G06F 21/575 713/1 |
| 2016/0110391 A1* | 4/2016 | Korycki | G06F 16/2228 707/741 |
| 2016/0239685 A1 | 8/2016 | Li et al. | |
| 2017/0194052 A1 | 7/2017 | Schmier et al. | |
| 2018/0239697 A1* | 8/2018 | Huang | G06F 12/0246 |
| 2018/0253260 A1* | 9/2018 | Marripudi | G06F 3/0611 |
| 2018/0359227 A1* | 12/2018 | Trantham | H04L 63/0457 |
| 2019/0026233 A1* | 1/2019 | Schlansker | G06F 15/173 |
| 2019/0087353 A1* | 3/2019 | Isozaki | G06F 12/1408 |
| 2019/0146931 A1* | 5/2019 | Frolikov | G06F 12/1408 713/193 |

OTHER PUBLICATIONS

"Data Security in NVDIMM," Anonymous, Technical Disclosure, IP.com, IPCOM000246467D, Jun. 9, 2016, pp. 1-6 https://ip.com/IPCOM/000246467.

* cited by examiner

*Primary Examiner* — Charles Rones
*Assistant Examiner* — Jonah C Krieger
(74) *Attorney, Agent, or Firm* — Larson Newman, LLP (57) ABSTRACT

An information handling system includes a first non-volatile memory, a central processing unit, and a basic input/output system (BIOS). The first non-volatile memory is divided into a plurality of namespaces including a first namespace and a second namespace. The central processing unit writes data to the first non-volatile memory by namespace of the non-volatile memory. The BIOS includes a key table. The key table stores a first key for the first non-volatile memory, a second key for the first namespace, and a third key for the second namespace. The second key is utilized to securely erase the first namespace without erasing the second namespace.

15 Claims, 5 Drawing Sheets

INFORMATION HANDLING SYSTEM WITH MULTI-KEY SECURE ERASE OF DISTRIBUTED NAMESPACE

FIELD OF THE DISCLOSURE

The present disclosure generally relates to information handling systems, and more particularly relates to an information handling system with a multi-key secure erase of distributed namespace.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a first non-volatile memory, a central processing unit, and a basic input/output system (BIOS). The first non-volatile memory may be divided into a plurality of namespaces including a first namespace and a second namespace. The central processing unit may write data to the first non-volatile memory by namespace. A key table of the BIOS may store a first key for the first non-volatile memory, a second key for the first namespace, and a third key for the second namespace. The second key may be utilized to securely erase the first namespace without erasing the second namespace.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
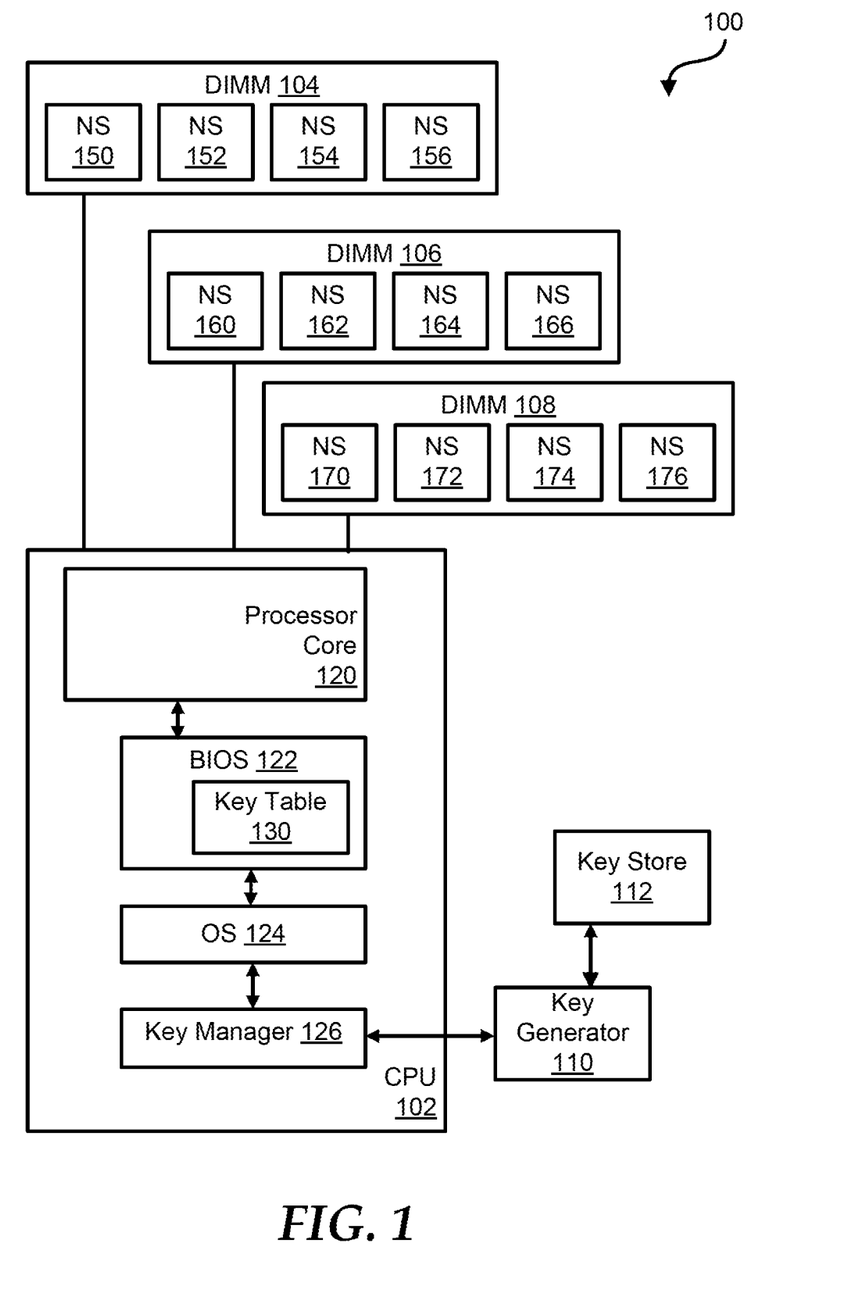
FIG. 1 is a block diagram of a portion of an information handling system according to at least one embodiment of the disclosure.

FIG. 1 shows a portion of an information handling system 100 including CPU 102, dual in-line memory modules (DIMMs) 104, 106, and 108, key generator circuitry 110, and a key store 112. In an embodiment, the information handling system 100 can be a server, a personal computer, a laptop computer, or the like. The CPU 102 includes a processor core 110, a basic input/output system (BIOS) 122, an operating system (OS) 124, and key manager circuitry 126. The BIOS 122 can include a non-volatile DIMM (NVDIMM) Firmware Interface Table (NFIT) 130. The DIMMs 104, 106, and 108 can be NVDIMMs. In an embodiment, the DIMMs 104, 106, and 108 can be partitioned into multiple portions or namespaces. For example, the DIMM 104 includes multiple namespaces 150, 152, 154, and 156 (150-156). The DIMM 106 includes multiple namespaces 160, 162, 164, and 166 (160-166). The DIMM 108 includes multiple namespaces 170, 172, 174, and 176 (160-166).

During operation, the key generator 110 can access the key store 112, such as a database or other memory, to provide a system level key or namespace owner key (NOK) to the key manager 126. The key manager 126 can then store the NOK within the key table of the NFIT 130. The NOK can be associated or assigned to each of the NVDIMMs 104, 106, and 108. In different embodiments, the key manager 126 can assign the same NOK to each of the NVDIMMs 104, 106, and 108, can assign a different NOK to each of the NVDIMMs 104, 106, and 108, can assign the same NOK to multiple NVDIMMs, such as 104 and 106, and a different NOK to NVDIMM 108, or the like.

The NOK can be utilized to securely erase each of NVDIMMs 104, 106, and 108 assigned the NOK. However, if on or more of the NVDIMMs 104, 106, and 108 is configured to host multiple virtual machines, the secure erase operation of the entire NVDIMM, via the NOK, can result in the data loss of the virtual machine's data stored on the NVDIMM. In an embodiment, each virtual machine can be assigned one or more namespaces on one or more of the NVDIMMs 104, 106, and 108. Additionally, the NVDIMMs 104, 106, and 108 can be configured so that an interleaved set namespace is created, which allows a namespace to be split across multiple physical NVDIMMs 104, 106, and 108. The assigning of different namespaces within the NVDIMMs 104, 106, and 108 to different virtual machines can provide high availability of data storage to multiple users at substantially the same time.

However, the secure erase of an NVDIMM 104, 106, or 108 can cause data issues from virtual machines assigned different namespaces. For example, if a namespace of a NVDIMM, such as namespace 150 on NVDIMM 104, is erased using the NOK for the NVDIMM 104, the entire NVDIMM 104 assigned the NOK is erased. In this situation, any virtual machine assigned one or more of the remaining namespaces 152, 154, and 156 on NVDIMM 104 will also have its data erase based on the NOK being assigned to the entire NVDIMM 104. Thus, the secure erase of a namespace, such as namespace 150 on NVDIMM 104, using a NOK can result in down time for virtual machines assigned other namespaces, such as namespaces 152-156, on the same NVDIMM 104. Additionally, in situation where an interleaved set namespace is split across more than no NVDIMM, such as NVDIMMs 106 and 108, and the NVDIMMs are assigned different NOKs, secure erase is not possible for the entire interleaved set namespace based on current secure erase methods because different NOKs are associated with the interleaved set namespace. Thus, an improvement to the secure erase of namespaces within DIMMs is provided herein.

In an embodiment, using a unique multi-key secure erase process, the key manager 126 can assign unique keys to one or more namespaces within the information handing system 100, so that one or more namespaces can be securely erased without having to secure erase the entire NVDIMM. The key manager 126 may be integrated into a pre-boot lifecycle controller, and can be utilized to create and maintain keys for the namespaces of the DIMMs 104, 106, and 108. The key manager 126 can also perform secure erase operations of one or more of the namespaces 150-156, 160-166, and 170-176 during a pre-boot cycle of the CPU 102. Then during runtime of the OS 124, runtime services can be utilized by the OS 124 to perform secure erase operations of one or more of the namespaces 150-156, 160-166, and 170-176 based on the keys in the NFIT 130. While these operations are being discussed with respect to NVDIMMs, the operations can be extended to all disk types including serial attached small computer system interface (SAS) drives, serial AT attachment (SATA) drives, non-volatile memory express (NVMe) drives, solid state drives (SSDs), hard disk drives (HDDs), or the like as long as the disk is configured with namespace partitions.

In an embodiment, the key generator 110 can be a trusted platform module (TPM) located on a motherboard of the information handling system 100. The key generator 110 can generate a first level key, or external key (Ext-Key). In an embodiment, the key generator 110 can be an external key generator, with respect to the CPU 102, and can be part of a key management interoperability protocol (KMIP) complaint distributed key management system. In another embodiment, the key generator 110 can be part of the CPU 102, such as an on-board bit-locker. After the first level key is generated, the key manager 126 can bind the first level key with a namespace identifier (ID). In an embodiment, the namespace ID can identify one or more namespaces within one or more NVDIMMs, such as multiple namespaces of an interleaved set located across multiple NVDIMMs.

The key manager 126 can then hash the first level key with a master volume key, NVDIMM-SK, of the NVDIMM where the namespace is located to generate the namespace level key, as shown in equation 1 below:

$$NS\text{-}Key(n) = HASH(Ext\text{-}Key(n), NVDIMM\text{-}SK) \qquad \text{EQ. 1}$$

The NS-Key can then be stored in a secure memory, such as the key store 112, a bit-locker universal serial bus (USB), or the like, and in the key table of the NFIT 130. In an embodiment, the key store 112 can be located in a KMIP capable server. The processor core 120 can then utilize the NS-Key to encrypt the namespaces identified by the namespace ID. Any read or write performed to a particular namespace includes a NS-Key for that namespace, which is compared to the NS-Key stored for that namespace in the NFIT 130. If the NS-Key provided in the read or write command does not match the NS-Key in the NFIT 130, then the command is not executed.

The namespace or namespaces associated with the namespace ID can be securely erased by the processor 120 causing the key generator 110 to modify Ext-Key for the namespace ID. The process described above can then be repeated to create a new NS-Key for the namespace or namespaces, and the new NS-Key can be stored in the secure memory, such as the key store 112, but not in the NFIT 130. This change in the Ext-Key can make the NS-Key for the namespace or namespace associated with the namespace ID become invalid, such that the NS-Key in any future read or write commands will not match the NS-Key in the NFIT 130. As a result of the NS-Key for the namespace or namespaces being invalid, these namespaces will be securely erased. In an embodiment, the different namespaces can be allocated to different virtual machines. In this situation, securely erasing only the namespaces bound to the NS-Key enables the virtual machines associated with the other namespaces in the NVDIMM to continue operation without interruption.

If the entire NVDIMM is to be securely erased, the processor 120 can cause the key generator 110 to modify NVDIMM-SK for the NVDIMM. The process described above can then be repeated to create new NS-Keys for all of the namespaces within the NVDIMM, and the new NS-Keys can be stored in the secure memory, such as the key store 112, but not in the NFIT 130. This change in the NVDIMM-SK can make the NS-Keys for the namespace within the NVDIMM become invalid, such that the NS-Key in any future read or write commands will not match the NS-Keys in the NFIT 130. As a result of the NS-Keys for the namespaces in the NVDIMM being invalid, entire NVDIMM will be securely erased.

Figure 2:
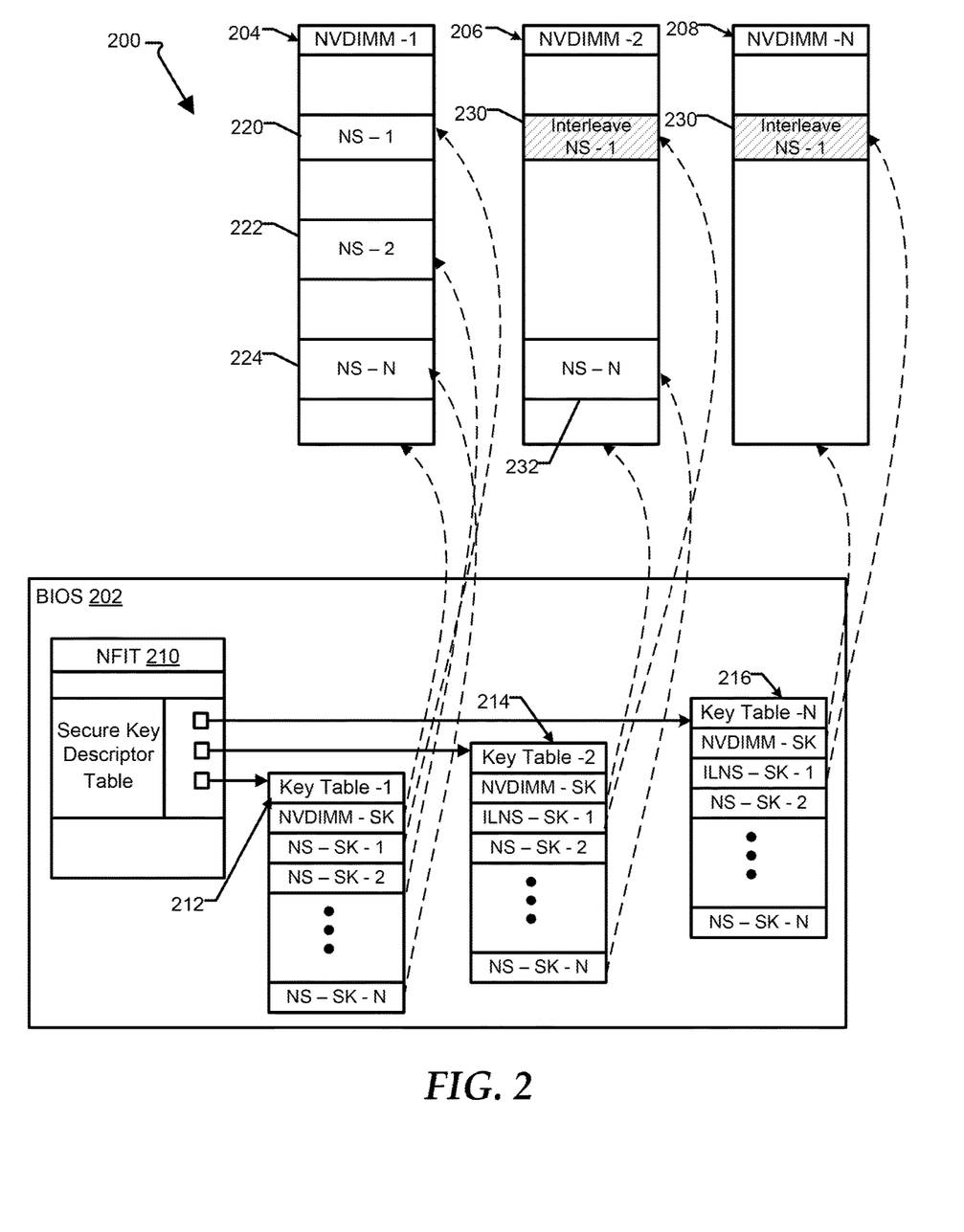
FIG. 2 is a diagram of a basic input output system (BIOS) with a key table for namespaces within the information handling system according to at least one embodiment of the disclosure.

FIG. 2 illustrates a BIOS 202 including a NFIT 210 having key tables 212, 214, and 216 for NVDIMMs 204, 206, and 208 according to at least one embodiment of the disclosure. In an embodiment, the BIOS 202 can be substantially similar to the BIOS 122 of FIG. 1, and the NVDIMMs 204, 206, 208 can be substantially similar to respective NVDIMMs 104, 106, and 108 of FIG. 1. The NVDIMM 204 can include namespaces 220, 222, and 224. The NVDIMM 206 can include a portion of an interleaved namespace 230 and a namespace 232. The NVDIMM 208 can include another portion of the interleaved namespace 230.

As shown in FIG. 2, each key table 212, 214, and 216 is associated with a different NVDIMM of the NVDIMMs 204, 206, and 208. The key table 212 can include a key associated with the entire NVDIMM 204, NVDIMM-SK, as shown by the dashed arrow between the NVDIMM-SK entry and the NVDIMM 204. The key table 212 can also include a key associated with the first namespace 220 of the NVDIMM 202, NS-SK-1, as shown by the dashed arrow between the NS-SK-1 entry and the first namespace 220 of the NVDIMM 204. The key, NS-SK-2, located within the key table 212 can be associated with the second namespace 222 of the NVDIMM 204, and the key, NS-SK-N, can be associated with the last namespace 224 of the NVDIMM 204. As described above, one or more of these keys can be modified to securely erase the associated namespace or namespaces.

The key table 212 can include a key associated with the entire NVDIMM 206, NVDIMM-SK, and the key table 214 a key associated with the entire NVDIMM 208, NVDIMM-SK. The key table 212 can also include a key associated with the interleaved namespace 230, ILNS-SK-1, within NVDIMM 206, and the key table 214 can include the same key, ILNS-SK-1, for the interleaved namespace 230 within NVDIMM 208. The key, NS-SK-N, within key table 214 can be associated with the last namespace 232 of the NVDIMM 206. As described above, one or more of these keys can be modified to securely erase the associated namespace or namespaces. For example, if the namespace key, ILNS-SK-1, is modified both of the interleaved namespaces 230 on NVDIMM 206 and NVDIMM 208 will be securely erased.

Figure 3:
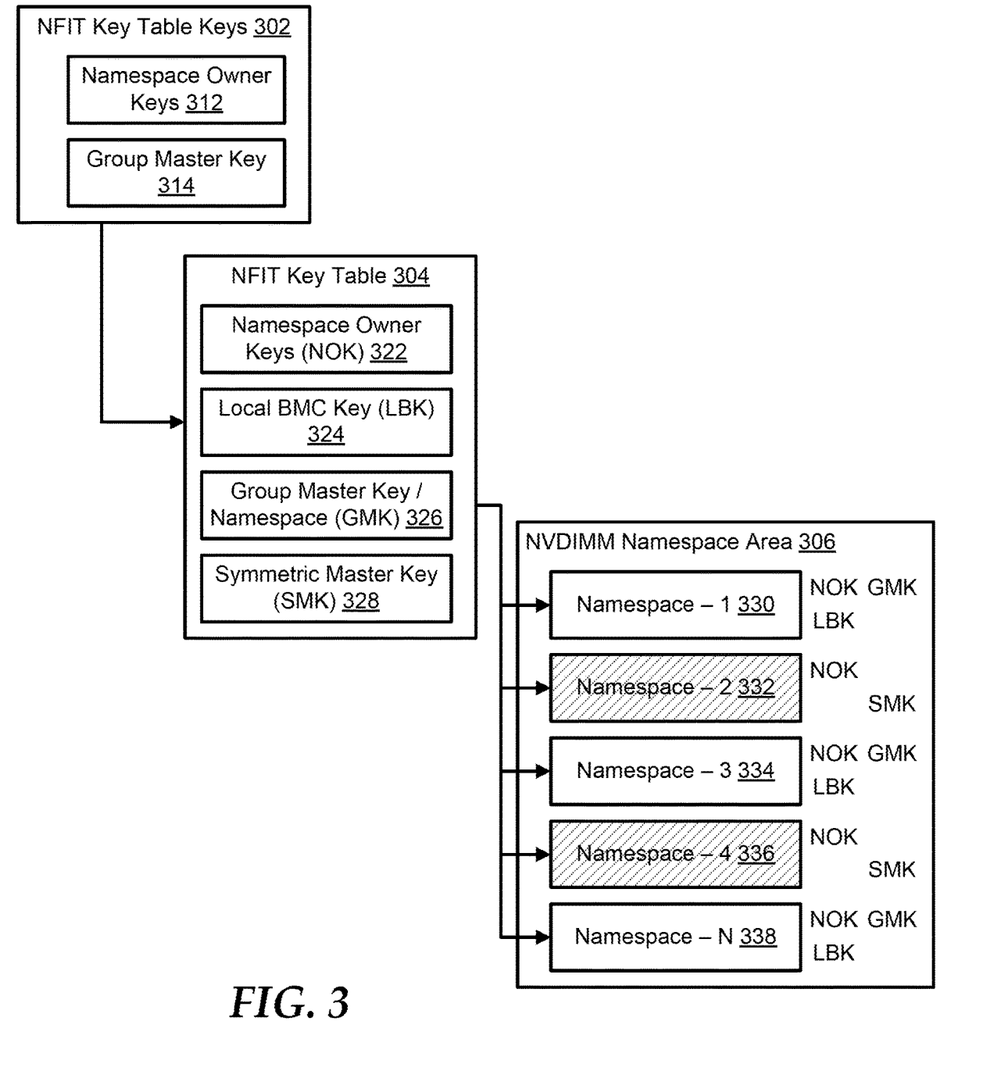
FIG. 3 is a diagram of key table layers with different namespaces having multiple keys according to at least one embodiment of the present disclosure.

FIG. 3 illustrates key table layers 302 and 304 associated with a namespace area 206 according to at least one embodiment of the present disclosure. The NFIT key table keys 302 can include a namespace owner key (NOK) 312 and a group master key (GMK) 314. In an embodiment, the namespace owner key 312 and the group master key 314 can be maintained across multiple information handling systems or servers, such as information handling system 100 of FIG. 1, such that the namespace owner key 312 and group master key 314 are utilized to grant or deny access to NFIT tables, such as NFIT key table 304, and to a key store memory, such as key store 112 of FIG. 1.

The NFIT key table 304 includes a NOK 322, local board management controller (BMC) keys (LBK) 324, group master/namespace keys (GMK) 326, and a symmetric master key (SMK) 328. In an embodiment, the NFIT key table 304 can be similar to the key tables 212, 214, and 216 of NFIT 210 in FIG. 2, such that the keys within the NFIT key table 304 are associated with the namespaces within a NVDIMM of the NVDIMM namespace area 306. Different keys can be generated and assigned to the namespaces 330, 332, 334, 336, and 338 (330-338) of the NVDIMM namespace area 306. For example, the NOK 322 can be assigned to each of the namespaces 330-338 as the key for the entire NVDIMM. Namespaces 330, 334, and 338 can be grouped together and all located on a single NVDIMM, such that each of the namespaces 330, 334, and 338 can the same keys. In particular, namespaces 330, 334, and 338 can all be assigned the same LBK 324 and GMK 326, which can be utilized to securely erase the namespaces 330, 334, and 338. Namespaces 332 and 336 can be grouped together. In particular, namespaces 332 and 336 can be assigned the same SMK 324, which can be utilized to securely erase the namespaces 332 and 336.

The use of the namespace owner key 312 and group master key 314 to lock the NFIT key table 304 and the key stores can provide a more secure and efficient key management system over previous implementations of key management for NVDIMMs. Additionally, the keys within the NFIT key table 304 can be generated as described above with respect to FIG. 1, such that the keys to erase or encrypt data within namespace can be three way match keys. This three way match keys can be 70 times stronger than existing secure key mechanisms.

In an embodiment, the keys can be floated over group managers, such as remote access controllers, for multiple information handling system or servers. Thus, if an NVDIMM is moved across servers within a group manager network, the secure erase and encrypt of namespaces within the NVDIMM can still operate without any distortion. This situation can arise because the group manager identifies the individual namespaces using a unique global unique identifier (GUID), which can be uniquely located over a network to provide extended security to any namespace in an NVDIMM.

Figure 4:
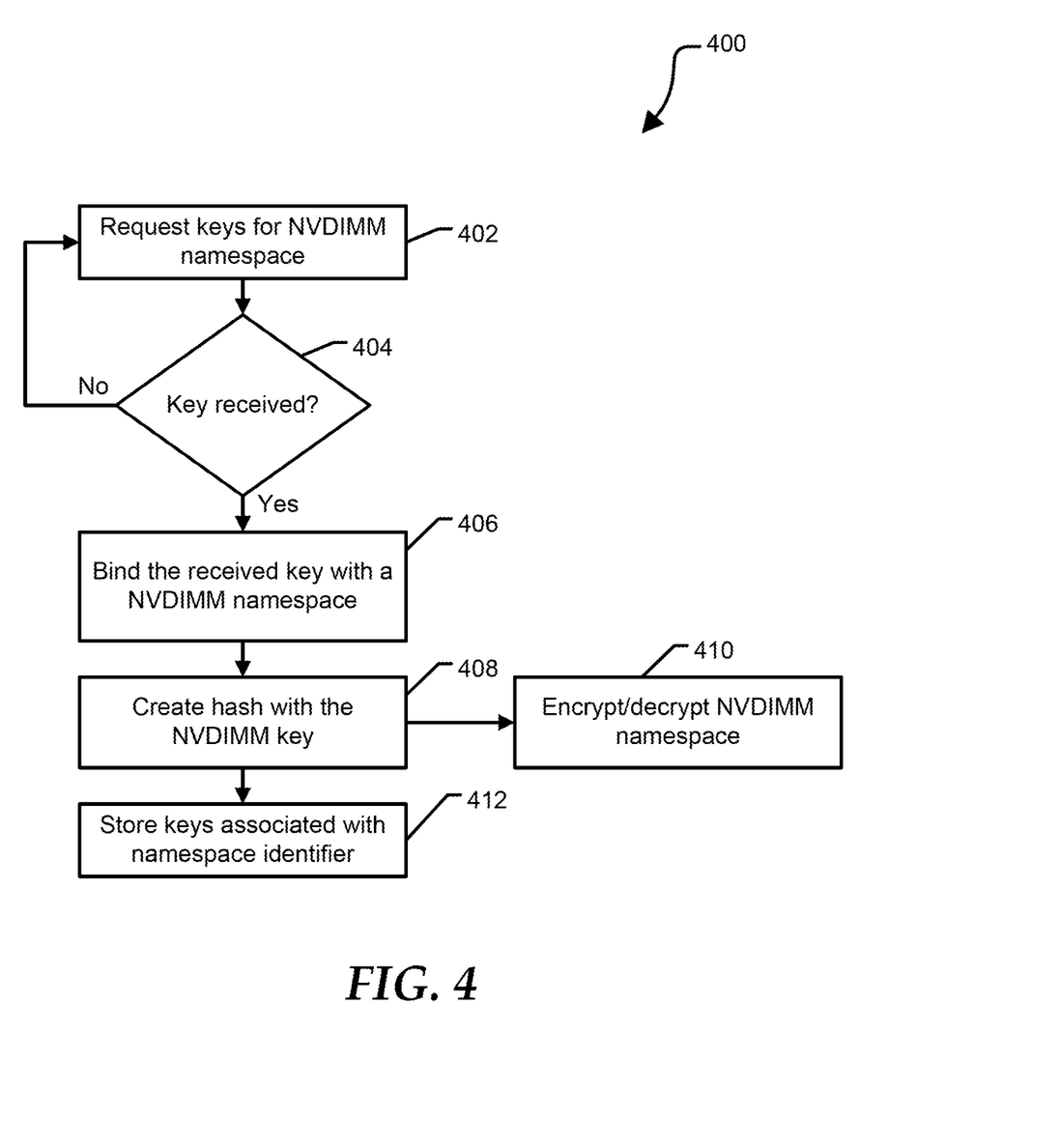
FIG. 4 is a flow diagram of a method for generating multiple keys for namespaces within an information handling system according to at least one embodiment of the present disclosure.

FIG. 4 is a flow diagram of a method 400 for generating multiple keys for namespaces within an information handling system according to at least one embodiment of the present disclosure. At block 402, a request for keys of an NVDIMM namespace is received. In an embodiment, the request can be received by a key manager from a processor core of an information handling system. A determination is made whether a key is received at block 404. If a key is not received, the flow continues as stated above at block 402. Otherwise, if a key is received, the received key is bound to the NVDIMM namespace at block 406. In an embodiment, the key can be received from a key generator that is external to a CPU of the processor core that requested the key.

At block 408, a hash of the key and a NVDIMM key is created. In an embodiment, the created hash can be a namespace key for the NVDIMM namespace. At block 410, the NVDIMM namespace can be encrypted or decrypted using the namespace key. At block 412, the namespace key associated with the namespace ID of the namespace is stored. In an embodiment, the namespace key can be stored within an NFIT of BIOS of the CPU.

Figure 5:
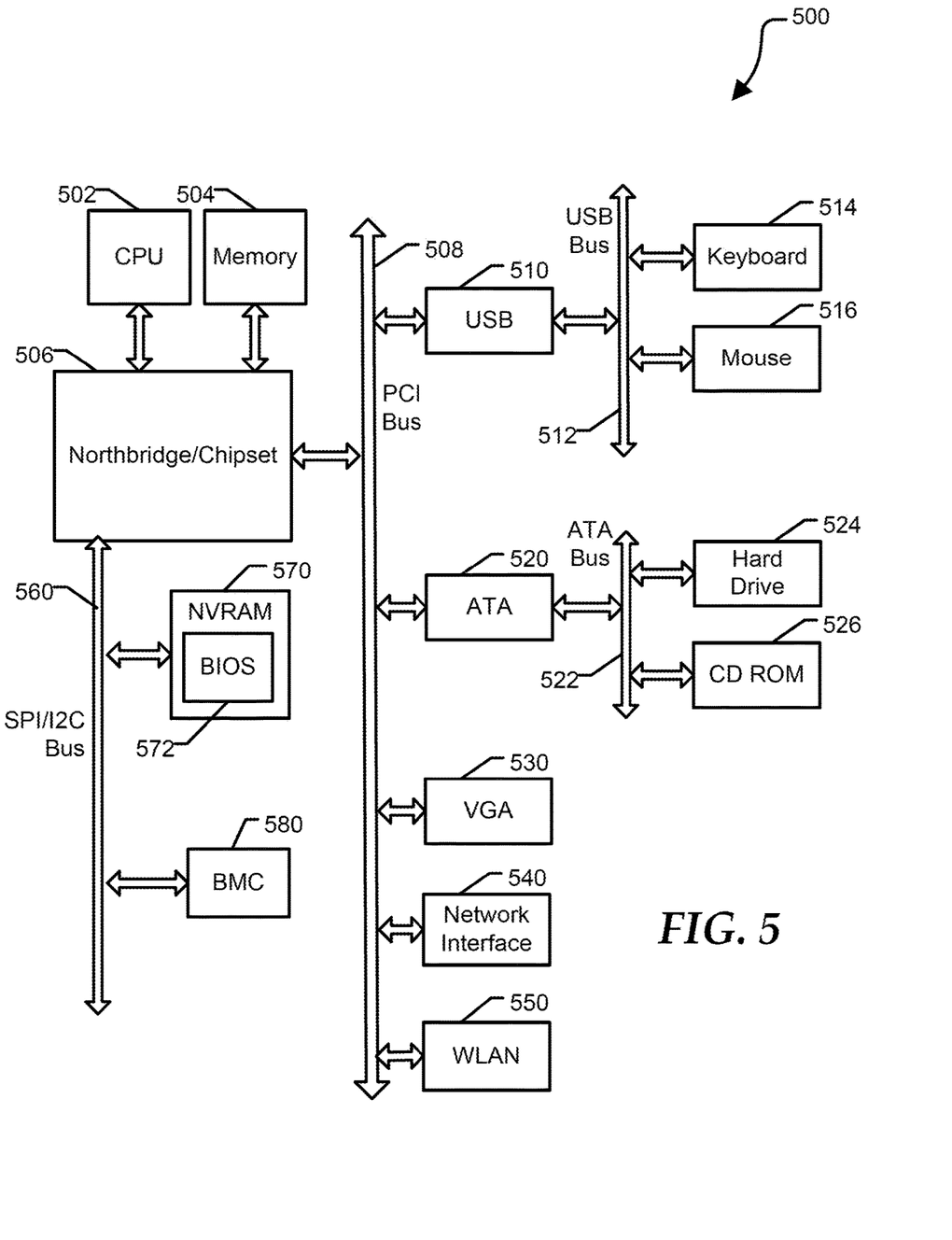
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a first non-volatile memory divided into a plurality of namespaces including a first namespace and a second namespace;
a central processing unit to communicate with the first non-volatile memory, the central processing unit to write data to the first non-volatile memory by namespace of the non-volatile memory;
a basic input/output system (BIOS) of the central processing unit, the BIOS including a key table to store a master volume key for the first non-volatile memory, a first namespace level key for the first namespace, and a second namespace level key for the second namespace, wherein the first namespace level key is utilized to securely erase the first namespace without erasing the second namespace;
a key manager to receive a first level key for the first namespace, to hash the first level key with the master volume key to generate the first namespace level key for the first namespace; and
a key generator to communicate with the central processing unit, the key generator to modify the master volume key to securely erase the first non-volatile memory including the first namespace and the second namespace, wherein the modification of the master volume key invalidates both the first namespace level key and the second namespace level key.

2. The information handling system of claim 1, the first non-volatile memory is a non-volatile dual in-line memory module.

3. The information handling system of claim 1, further comprising:
a second non-volatile memory divided into a plurality of namespaces including a third namespace and a fourth namespace, wherein the third namespace is in an interleaved namespace set with the first namespace of the first non-volatile memory; and
the key table to store the first namespace level key for the third namespace, and a fourth key for the fourth namespace, wherein the first namespace level key is utilized to securely erase the first and third namespaces without erasing the second and fourth namespaces.

4. The information handling system of claim 1, wherein the first namespace is allocated to a first virtual machine and the second namespace is allocated to a second virtual machine.

5. The information handling system of claim 4, wherein the second virtual machine continues operations without interruption after the first namespace is securely erased.

6. A method comprising:
dividing a non-volatile memory into a plurality of namespaces including a first namespace and a second namespace;
storing a master volume key for the non-volatile memory in a key table of a basic input/output system;
receiving, by a key manager, a first level key for the first namespace;
hashing, by the key manager, the first level key with the master volume key to generate a first namespace level key for the first namespace;
storing the first namespace level key for the first namespace in the key table;
receiving, by the key manager, a second level key for the second namespace;
hashing, by the key manager, the second level key with the master volume key to generate a second namespace level key for the first namespace;
storing the second namespace level key for the second namespace in the key table;
securely erasing the first namespace via the first namespace level key without erasing the second namespace; and
modifying the master volume key to securely erase the first non-volatile memory including the first namespace and the second namespace, wherein the modifying of the master volume key invalidates both the first namespace level key and the second namespace level key.

7. The method of claim 6, further comprising:
dividing a second non-volatile memory into a plurality of namespaces including a third namespace and a fourth namespace, wherein the third namespace is in an interleaved namespace set with the first namespace of the first non-volatile memory; and
storing in the key table the first namespace level key for the third namespace;

storing in the key table a fourth key for the fourth namespace; and securely erasing the first and third namespaces via the first namespace level key without erasing the second and fourth namespaces.

8. The method of claim 6, further comprising:

allocating the first namespace is to a first virtual machine; and allocating the second namespace to a second virtual machine.

9. The method of claim 8, further comprising:

continuing operations, by the second virtual machine, without interruption after the first namespace is securely erased.

10. The method of claim 6, wherein the first non-volatile memory is a non-volatile dual in-line memory module.

11. A method comprising:

receiving, by a key generator of an information handling system, a request to generate a first namespace level key for a first namespace within a first non-volatile memory of the information handling system;

generating, by the key generator, a first level key in response to the request;

binding, by a key manager, the first level key to a namespace identifier of the first namespace;

hashing, by a key manager, first level key and a master volume key of the first non-volatile memory to create the first namespace level key;

storing the first namespace level key for the first namespace in a key table of a basic input/output system of the information handling system; and modifying the second master key to securely erase the first non-volatile memory including the first namespace and a second namespace, wherein the modifying of the master key invalidates both the first namespace level key and a second namespace level key, wherein the second namespace level key is for the second namespace.

12. The method of claim 11, further comprising:

securely erasing the first namespace via the first namespace level key without erasing the second namespace of the first non-volatile memory.

13. The method of claim 12, further comprising:

storing, in the key table, the first namespace level key for a third namespace of a second non-volatile memory, wherein the first namespace is in an interleaved namespace set with the third namespace; and securely erasing the first and third namespaces via the first namespace level key without erasing the second namespace.

14. The method of claim 12, further comprising:

allocating the first namespace to a first virtual machine; and allocating the second namespace to a second virtual machine.

15. The method of claim 14, further comprising:

continuing operations, by the second virtual machine, without interruption after the first namespace is securely erased.

\* \* \* \* \*

UNITED STATES PATENT AND TRADEMARK OFFICE
CERTIFICATE OF CORRECTION

PATENT NO. : 10,732,889 B2
APPLICATION NO. : 15/918503
DATED : August 4, 2020
INVENTOR(S) : Shekar Babu Suryanarayana et al.

It is certified that error appears in the above-identified patent and that said Letters Patent is hereby corrected as shown below:

In the Claims

Column 12, Line 1: in Claim 11, Please change "the second master key" to --the master key--

Signed and Sealed this
Sixth Day of October, 2020

Andrei Iancu
*Director of the United States Patent and Trademark Office*